(12) United States Patent
Muthu et al.

(10) Patent No.: US 10,205,955 B2
(45) Date of Patent: Feb. 12, 2019

(54) METHOD AND SYSTEM FOR TRANSCODING A DIGITAL VIDEO

(71) Applicant: RIVERSILICA TECHNOLOGIES PVT LTD, Bangalore (IN)

(72) Inventors: Essaki P Muthu, Bangalore (IN); Jagadish K Kamath, Bangalore (IN); Raju Babannavar, Bangalore (IN)

(73) Assignee: RIVERSILICA TECHNOLOGIES PVT LTD, Bangalore (IN)

( * ) Notice: Subject to any disclaimer, the term of this patent is extended or adjusted under 35 U.S.C. 154(b) by 73 days.

(21) Appl. No.: 14/907,557

(22) PCT Filed: Jul. 26, 2014

(86) PCT No.: PCT/IB2014/063449
§ 371 (c)(1),
(2) Date: Jan. 25, 2016

(87) PCT Pub. No.: WO2015/025237
PCT Pub. Date: Feb. 26, 2015

(65) Prior Publication Data
US 2016/0165245 A1    Jun. 9, 2016

(30) Foreign Application Priority Data

Jul. 26, 2013    (IN) .......................... 3348/CHE/2013

(51) Int. Cl.
*H04N 19/40*    (2014.01)
*H04N 19/176*   (2014.01)
(Continued)

(52) U.S. Cl.
CPC ........... *H04N 19/40* (2014.11); *H04N 19/105* (2014.11); *H04N 19/119* (2014.11);
(Continued)

(58) Field of Classification Search
CPC ..................................................... H04N 19/40
See application file for complete search history.

(56) References Cited

U.S. PATENT DOCUMENTS 7,177,356 B2    12/2007    Moni et al.
7,606,305 B1    10/2009    Rault
(Continued)

*Primary Examiner* — Anner N Holder
*Assistant Examiner* — Hesham K Abouzahra
(74) *Attorney, Agent, or Firm* — Maschoff Brennan

(57) ABSTRACT

The present disclosure relates to a method and a system for transcoding a digital video. The method and system includes a decoder, a hierarchical motion sampling and re-estimation engine, a resizing engine and an encoder. The decoder extracts a plurality of pre-determined decoder information pertaining to each macroblock of a plurality of macroblocks of each of a decoded frame of a plurality of decoded frames of the digital video. The decoder information includes syntax elements. The hierarchical motion sampling and re-estimation engine evaluates hierarchically the syntax elements pertaining to the each macroblock of the plurality of macroblocks of the plurality of decoded frames. The resizing engine resizes each of the macroblock of the plurality of macroblocks based on evaluated hierarchical syntax elements. The encoder encodes each of re-sized macroblock based on the evaluated hierarchical syntax elements.

5 Claims, 10 Drawing Sheets

(51) Int. Cl.

| | |
|---|---|
| *H04N 19/105* | (2014.01) |
| *H04N 19/139* | (2014.01) |
| *H04N 19/513* | (2014.01) |
| *H04N 19/96* | (2014.01) |
| *H04N 19/119* | (2014.01) |
| *H04N 19/124* | (2014.01) |
| *H04N 19/186* | (2014.01) |
| *H04N 19/31* | (2014.01) |
| *H04N 19/43* | (2014.01) |
| *H04N 19/44* | (2014.01) |
| *H04N 19/52* | (2014.01) |
| *H04N 19/593* | (2014.01) |
| *H04N 19/70* | (2014.01) |

(52) U.S. Cl.
CPC ......... *H04N 19/124* (2014.11); *H04N 19/139* (2014.11); *H04N 19/176* (2014.11); *H04N 19/186* (2014.11); *H04N 19/31* (2014.11); *H04N 19/43* (2014.11); *H04N 19/44* (2014.11); *H04N 19/513* (2014.11); *H04N 19/52* (2014.11); *H04N 19/593* (2014.11); *H04N 19/70* (2014.11); *H04N 19/96* (2014.11)

(56) References Cited

U.S. PATENT DOCUMENTS

| | | | |
|---|---|---|---|
| 7,839,933 B2 | 11/2010 | Lin et al. | |
| 9,197,903 B2* | 11/2015 | Tripathi | ............... H04N 19/176 |
| 2005/0232497 A1* | 10/2005 | Yogeshwar | ............ H04N 19/56 |
| | | | 382/232 |
| 2008/0130746 A1* | 6/2008 | Soroushian | .......... H04N 19/176 |
| | | | 375/240.15 |
| 2010/0118948 A1 | 5/2010 | Chatterjee et al. | |
| 2010/0118982 A1 | 5/2010 | Chatterjee | |
| 2014/0232934 A1* | 8/2014 | Choi | ................ H04N 21/23430 |
| | | | 348/441 |

* cited by examiner

| QP | 0 | 1 | 2 | 3 | 4 | 5 | 6 |
|---|---|---|---|---|---|---|---|
| QStep | 0.625 | 0.6875 | 0.75 | 0.875 | 0.9375 | 1.0625 | 1.25 |
| QP | 7 | 8 | 9 | 10 | 11 | 12 | |
| QStep | 1.375 | 1.5625 | 1.75 | 1.9375 | 2.1875 | 2.5 | |
| QP | 13 | 14 | 15 | 16 | 17 | 18 | 19 |
| QStep | 2.75 | 3.125 | 3.5 | 3.9375 | 4.4375 | 5 | 5.5625 |
| QP | 20 | 21 | 22 | 23 | 24 | 25 | |
| QStep | 6.25 | 7.0625 | 7.875 | 8.875 | 10 | 11.1875 | |
| QP | 26 | 27 | 28 | 29 | 30 | 31 | 32 |
| QStep | 12.5625 | 14.125 | 15.8125 | 17.8125 | 20 | 22.4375 | 25.1875 |
| QP | 33 | 34 | 35 | 36 | 37 | 38 | |
| QStep | 28.25 | 31.6875 | 35.625 | 40 | 44.875 | 50.375 | |
| QP | 39 | 40 | 41 | 42 | 43 | 44 | 45 |
| QStep | 56.5625 | 63.4375 | 71.25 | 80 | 89.75 | 100.75 | 113.125 |
| QP | 46 | 47 | 48 | 49 | 50 | 51 | |
| QStep | 126.9375 | 142.5 | 160 | 179.5625 | 201.5625 | 226.25 | |

| | Intra_4x4 / Intra_8x8 | | | | | | | | Intra_16x16 | | |
|---|---|---|---|---|---|---|---|---|---|---|---|
| V | H | DC | DDL | DDR | VR | HD | VL | HU | V | H | DC | P |
| 135 | 45 | 0 | 180 | 90 | 112.5 | 67.5 | 157.5 | 22.5 | 135 | 45 | 0 | 90 |

| DC @ (0,0) | DC @ first row | DC @ first col | DC others | H | V | P |
|---|---|---|---|---|---|---|
| 360 | 0 | 90 | 45 | 0 | 90 | 45 |

| QPYe | <29 | 29 | 30 | 31 | 32 | 33 | 34 | 35 | 36 | 37 | 38 | 39 |
|---|---|---|---|---|---|---|---|---|---|---|---|---|
| thr_Q P | 0 | 0 | 0 | 0 | 0 | 2 | 3 | 4 | 8 | 8 | 8 | 8 |
| thr_P 16x16 | 0 | 0 | 1 | 1 | 1 | 1 | 1 | 1 | 8 | 8 | 8 | 8 |
| thr_sk ip | 0 | 1 | 1 | 1 | 1 | 1 | 1 | 1 | 2 | 2 | 2 | 2 |
| QPYe | 40 | 41 | 42 | 43 | 44 | 45 | 46 | 47 | 48 | 49 | 50 | 51 |
| thr_Q P | 8 | 8 | 8 | 8 | 8 | 8 | 8 | 8 | 8 | 8 | 8 | 8 |
| thr_P 16x16 | 8 | 8 | 8 | 8 | 8 | 8 | 8 | 8 | 8 | 8 | 8 | 8 |
| thr_Q P_ski p | 2 | 2 | 2 | 2 | 2 | 2 | 2 | 2 | 2 | 2 | 2 | 2 |

FIG. 8

METHOD AND SYSTEM FOR TRANSCODING A DIGITAL VIDEO

TECHNICAL FIELD

The present disclosure relates to the field of digital videos and, in particular, relates to the transcoding of digital videos.

BACKGROUND

With the advancement in technology and advent of Internet, a video is rendered and presented on a number of devices. More often than not, these devices have varying capabilities and attributes. In addition, due to diversity in display devices (for e.g., mobile phones, laptops, televisions and the like) and their capabilities, intermediate state of content adaptation is required to enable the content from a source to adequately function on the target device. This often necessitates transcoding the video between different formats adapted for presenting the video on these different devices.

Transcoding may be performed on variety of data contents including audio, video and the like and converts incompatible or obsolete data to formats that are supported on variety of target devices. Moreover, transcoding improves compression performance of the video. For example, a video that is easily rendered on a television may need to be resized for rendering on a smaller display screen of a mobile device. Generally, transcoding of the video involves compressing of images in the video to reduce file sizes to overcome huge storage demands and high quality digital video equipment for rendering the video.

Conventionally, transcoding the video (say encoding a resized video) typically involves performing computationally intensive steps of motion estimation and mode decision. The input to an encoder in a transcoder that performs the encoding includes information about each frame of the video. However, in conventional systems, the encoder performs the motion estimation and the mode decision independently without considering the available information about the frame. Failing to make use of the available information of the frame by the encoder increases computational complexities.

In view of the aforementioned problems discussed above, there is a need for a method and system that overcomes the above stated disadvantages.

SUMMARY

In accordance with an aspect of the present disclosure, a method and a system for transcoding a digital video is provided. The method includes extracting a plurality of pre-determined decoder information pertaining to each macroblock of a plurality of macroblocks of each of a decoded frame of a plurality of decoded frames of the digital video, evaluating hierarchically the syntax elements pertaining to the each macroblock of the plurality of macroblocks of the plurality of decoded frames, resizing each of the macroblock of the plurality of macroblocks based on evaluated hierarchical syntax elements, encoding each of re-sized macroblock based on the evaluated hierarchical syntax elements.

In an embodiment of the present disclosure, the method includes partitioning each frame of the plurality of frames of the digital video into the plurality of macroblocks and encoding the each macroblock of the each frame of the plurality of frames of the digital video.

In another embodiment of the present disclosure, the evaluating of the syntax elements pertaining to the each macroblock of the plurality of macroblocks of the plurality of decoded frames includes refining the syntax elements for motion estimation.

In yet another embodiment of the present disclosure, the refined syntax elements serves as initial seed positions. The seed position being a position of a pixel in the decoded frame that is a probable motion vector for a macroblock or a sub-macroblock.

In yet another embodiment of the present disclosure, the evaluating of the syntax elements pertaining to the each macroblock of the plurality of macroblocks of the plurality of decoded frames includes determining prediction mode of each of the sub-macroblock of the each macroblock of the plurality of macroblocks of the plurality of frames based on second pre-defined criteria.

In yet another embodiment of the present disclosure, the method includes re-estimating each of the evaluated syntax elements pertaining to the each macroblock of the plurality of macroblocks.

In yet another embodiment of the present disclosure, the resizing each of the macroblock of the plurality of macroblocks based on the evaluated hierarchical syntax elements includes determining mode decision for each of the sub-macroblock of the each macroblock of the plurality of macroblocks of each of the plurality of frames based on first pre-defined criteria.

In yet another embodiment of the present disclosure, the syntax elements pertaining to the each macroblock of the plurality of macroblocks is at least one of a macroblock type, sub-macroblock type, quantization parameter (QP), intra luma modes, intra chroma modes, motion vectors, and skips information of each of the decoded macroblocks.

In another aspect of the present disclosure, the system for transcoding a digital video is provided. The system includes a decoder, a hierarchical motion sampling and re-estimation engine, a resizing engine and an encoder. The decoder extracts a plurality of pre-determined decoder information pertaining to the each macroblock of the plurality of macroblocks of each of the decoded frame of the plurality of decoded frames of the digital video. The decoder information includes syntax elements. The hierarchical motion sampling and re-estimation engine evaluates hierarchically the syntax elements pertaining to the each macroblock of the plurality of macroblocks of the plurality of decoded frames. The resizing engine resizes each of the macroblock of the plurality of macroblocks based on the evaluated hierarchical syntax elements. The encoder encodes each of the re-sized macroblock based on the evaluated hierarchical syntax elements.

In an embodiment of the present disclosure, the encoder partitions the each frame of the plurality of frames of the digital video into the plurality of macroblocks. In addition, the encoder encodes the each macroblock of the each frame of the plurality of frames of the digital video.

In another embodiment of the present disclosure, evaluating of the syntax elements pertaining to the each macroblock of the plurality of macroblocks of the plurality of decoded frames by the hierarchical motion sampling and re-estimation engine includes refining the syntax elements for motion estimation.

In yet another embodiment of the present disclosure, the refined syntax elements serves as initial seed positions. The seed position is a position of a pixel in the decoded frame that is a probable motion vector for a macroblock or a sub-macroblock.

In yet another embodiment of the present disclosure, the hierarchical motion sampling and re-estimation engine evaluates the syntax elements pertaining to the each macroblock of the plurality of macroblocks of the plurality of decoded frames by determining prediction mode of each of the sub-macroblock of the each macroblock of the plurality of macroblocks of the plurality of frames based on the second pre-defined criteria.

In yet another embodiment of the present disclosure, the encoder re-estimates each of the evaluated syntax elements pertaining to the each macroblock of the plurality of macroblocks.

In yet another embodiment of the present disclosure, the resizing engines resizes each of the macroblock of the plurality of macroblocks based on the evaluated hierarchical syntax elements by determining mode decision for each of the sub-macroblock of the each macroblock of the plurality of macroblocks of each of the plurality of frames based on the first pre-defined criteria.

In yet another embodiment of the present disclosure, the syntax elements pertaining to the each macroblock of the plurality of macroblocks is at least one of a macroblock type, sub-macroblock type, quantization parameter (QP), intra luma modes, intra chroma modes, motion vectors, and skips information of each of the decoded macroblocks.

In yet another embodiment of the present disclosure, the hierarchical motion sampling and re-estimation engine evaluates the syntax elements pertaining to the each macroblock of the plurality of macroblocks of the plurality of decoded frames includes determining prediction mode of each of the sub-macroblock of the each macroblock of the plurality of macroblocks of the plurality of frames based on the second pre-defined criteria.

In yet another aspect of the present disclosure, a computer system for transcoding a digital video is provided. The computer system includes one or more processors and a non-transitory memory. The non-transitory memory includes instructions that, when executed by the one or more processors, causes a transcoding module of the one or more processors to perform a set of steps. The set of steps include extracting, by the decoder, the plurality of pre-determined decoder information pertaining to the each macroblock of the plurality of macroblocks of each of the decoded frame of the plurality of decoded frames of the digital video, evaluating, by the hierarchical motion sampling and re-estimation engine, hierarchically the syntax elements pertaining to each the macroblock of the plurality of macroblocks of the plurality of decoded frames by determining prediction mode of each of the sub-macroblock of the each macroblock of the plurality of macroblocks of the plurality of frames based on the second pre-defined criteria, resizing, by the resizing engine, each of the macroblock of the plurality of macroblocks based on the evaluated hierarchical syntax elements, encoding, by the encoder, each of the re-sized macroblock based on the evaluated hierarchical syntax elements.

In an embodiment of the present disclosure, the resizing engine resizes each of the macroblock of the plurality of macroblocks based on the evaluated hierarchical syntax elements by determining mode decision for each of the sub-macroblock of the each macroblock of the plurality of macroblocks of each of the plurality of frames based on the first pre-defined criteria.

BRIEF DESCRIPTION OF THE FIGURES

Figure 1:
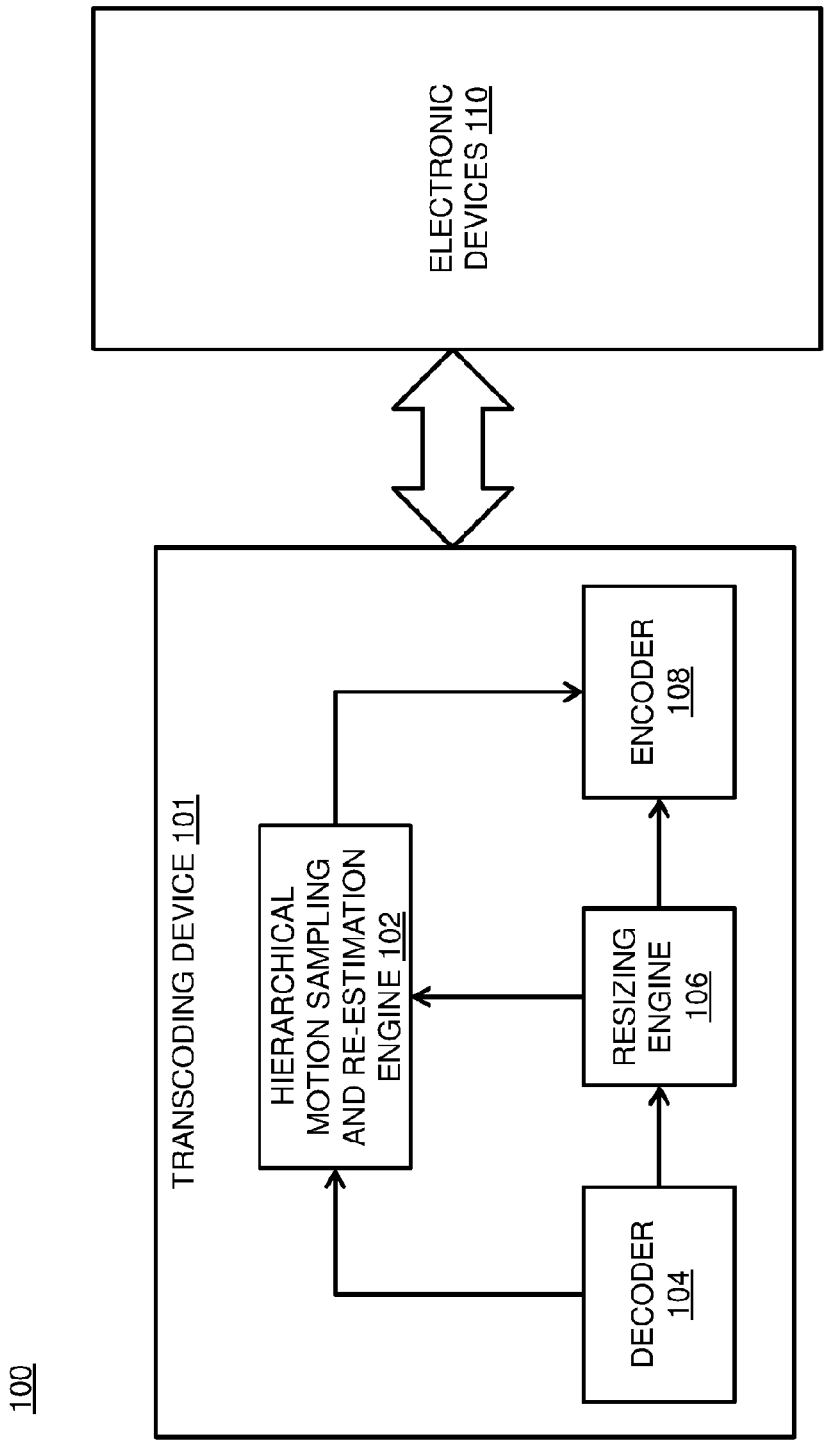
Figure 2:
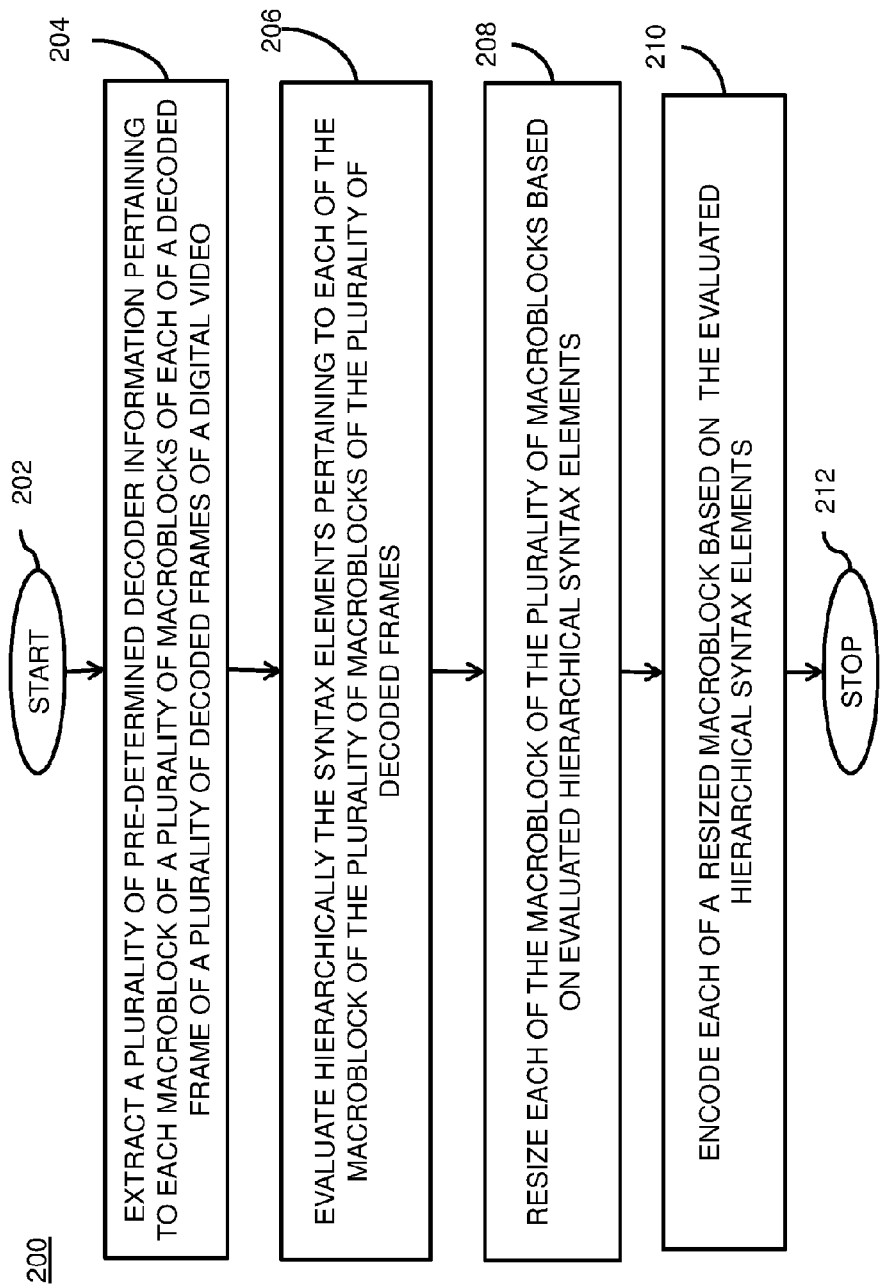
Figure 3:
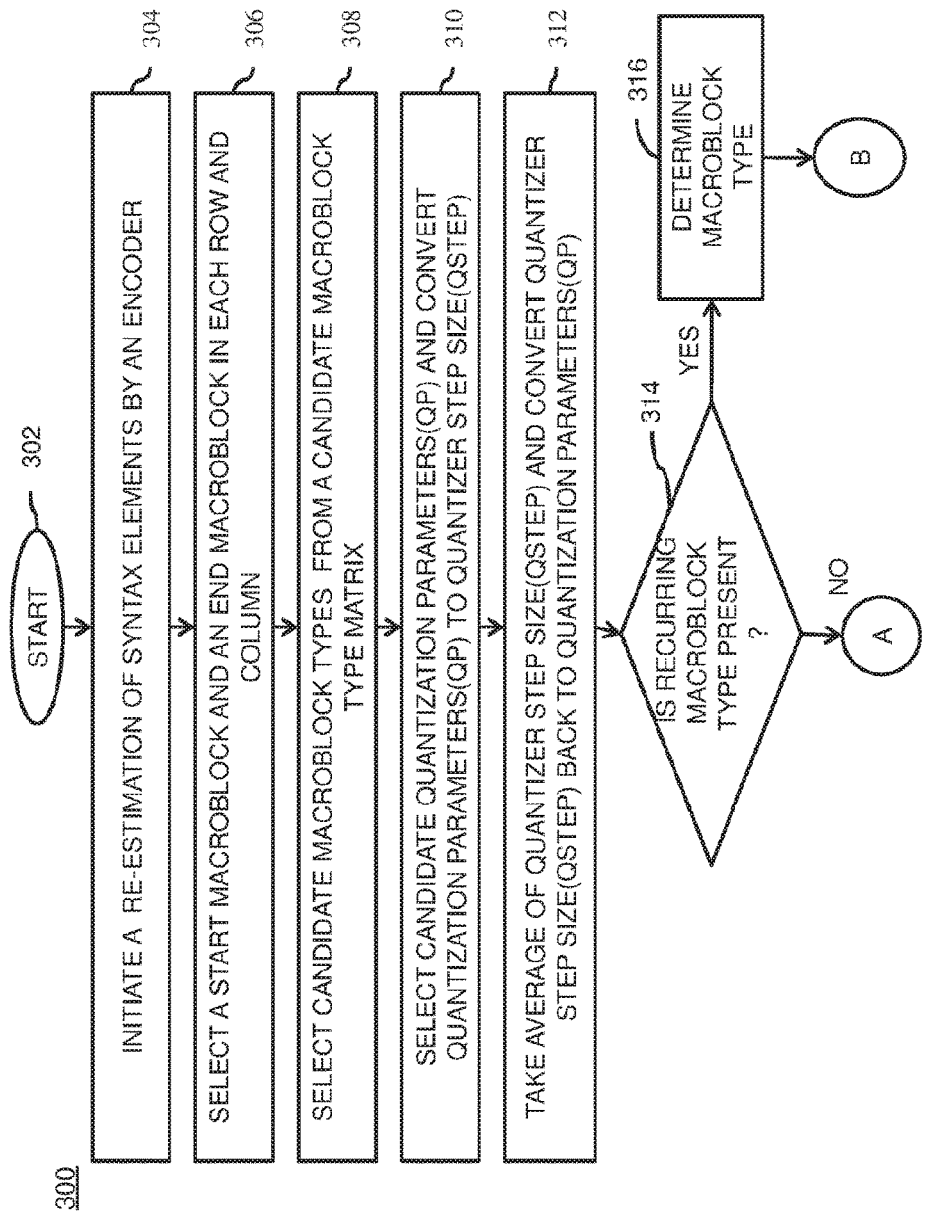
Figure 3:
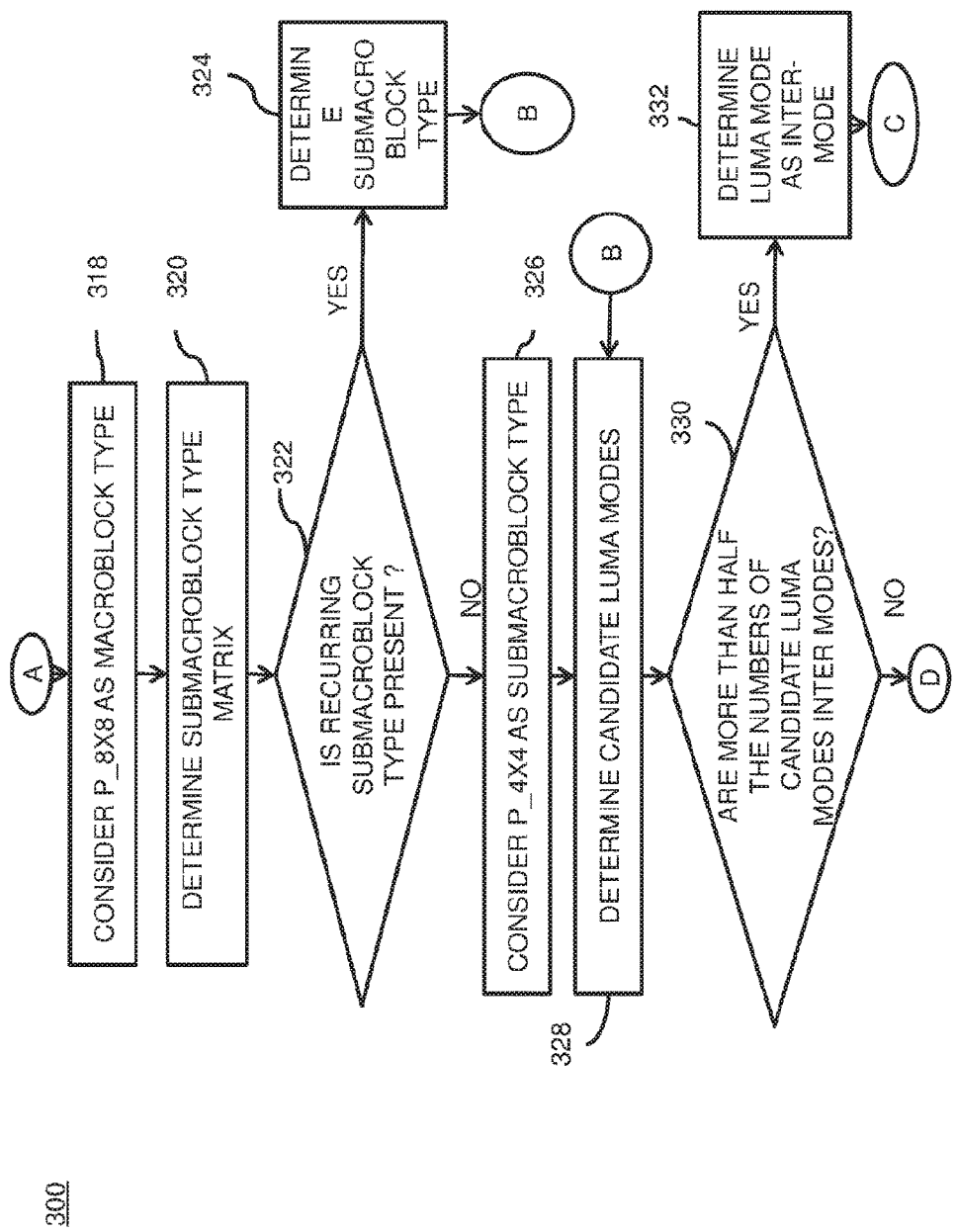
Figure 3:
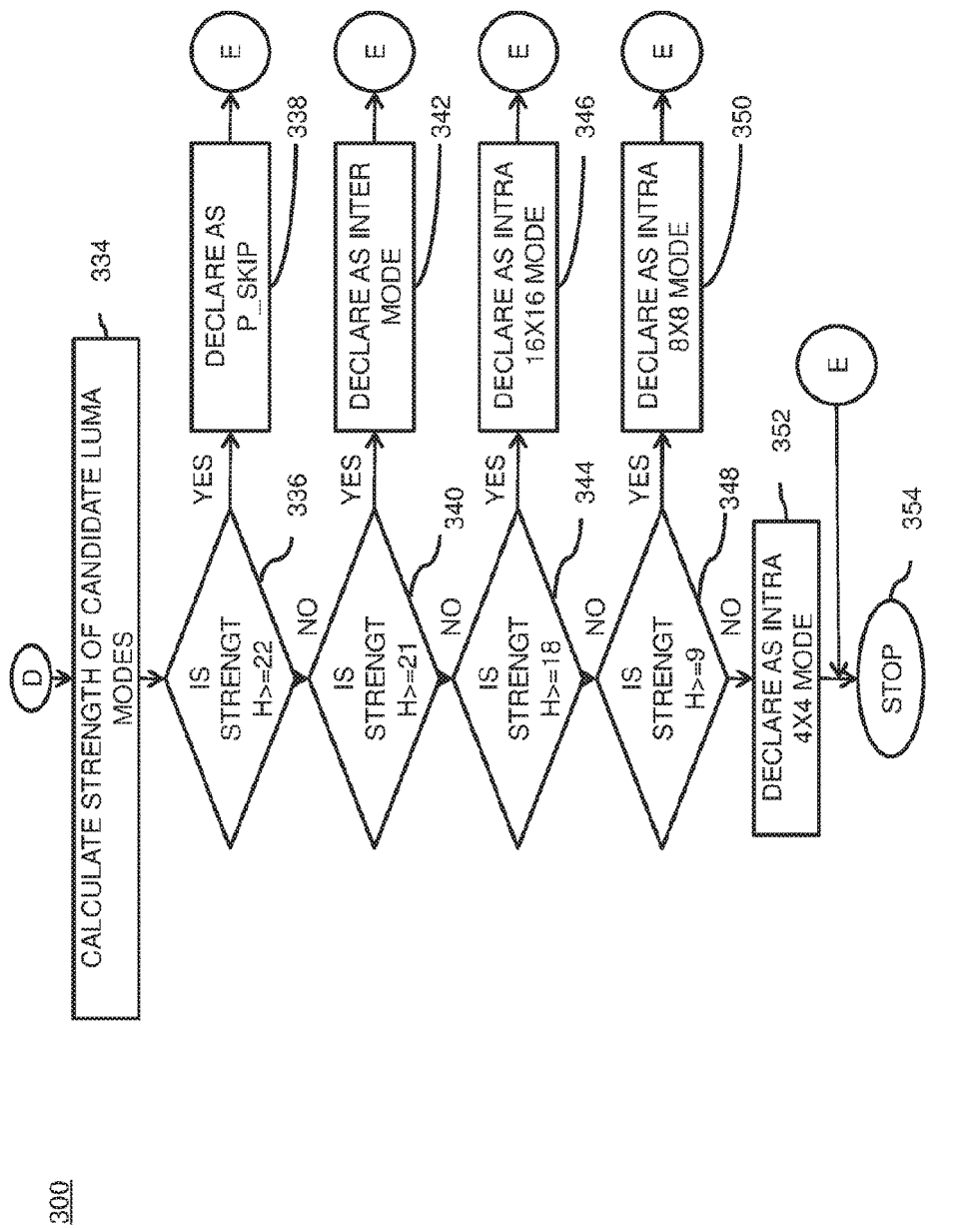
Figure 5:
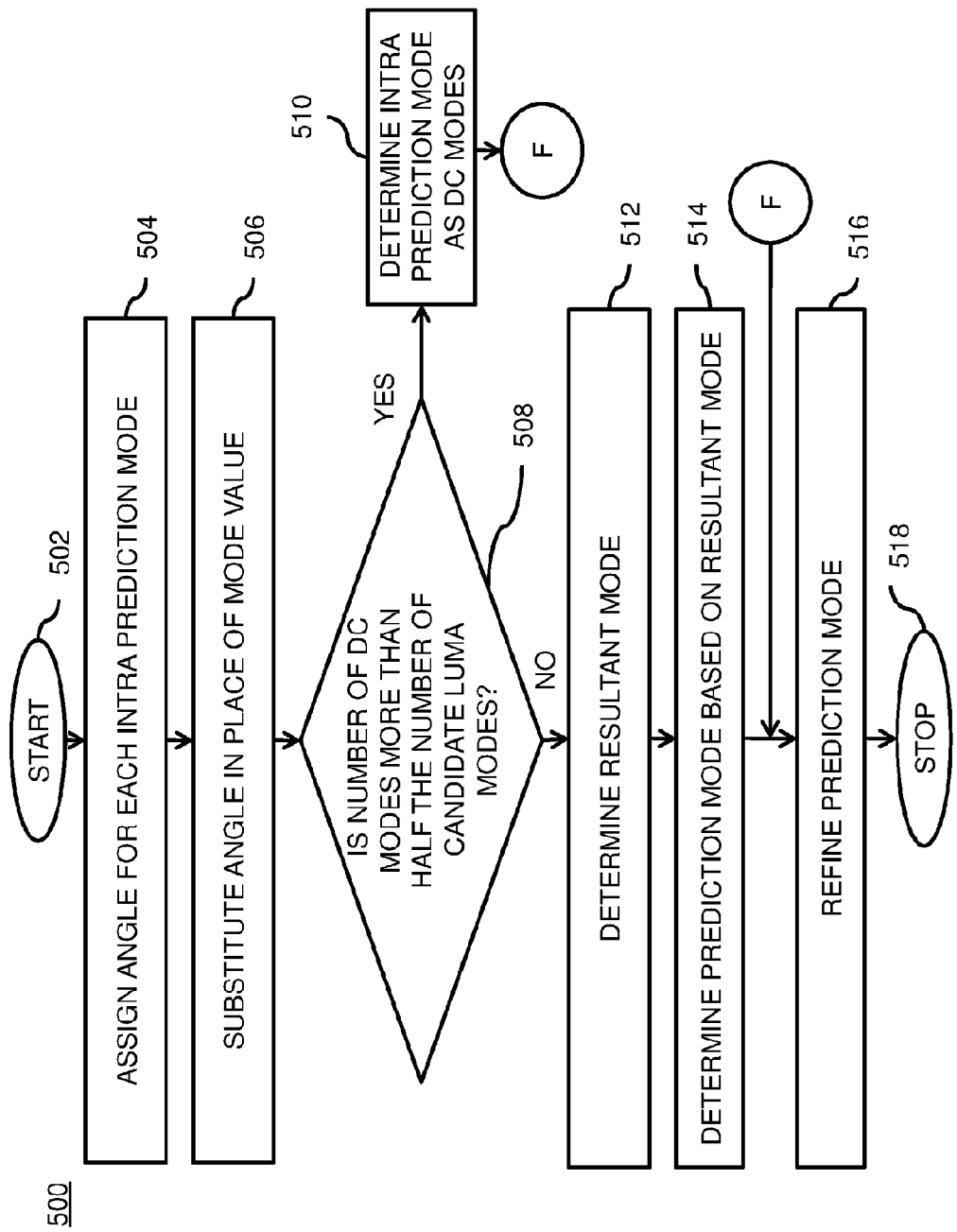
Figure 7:
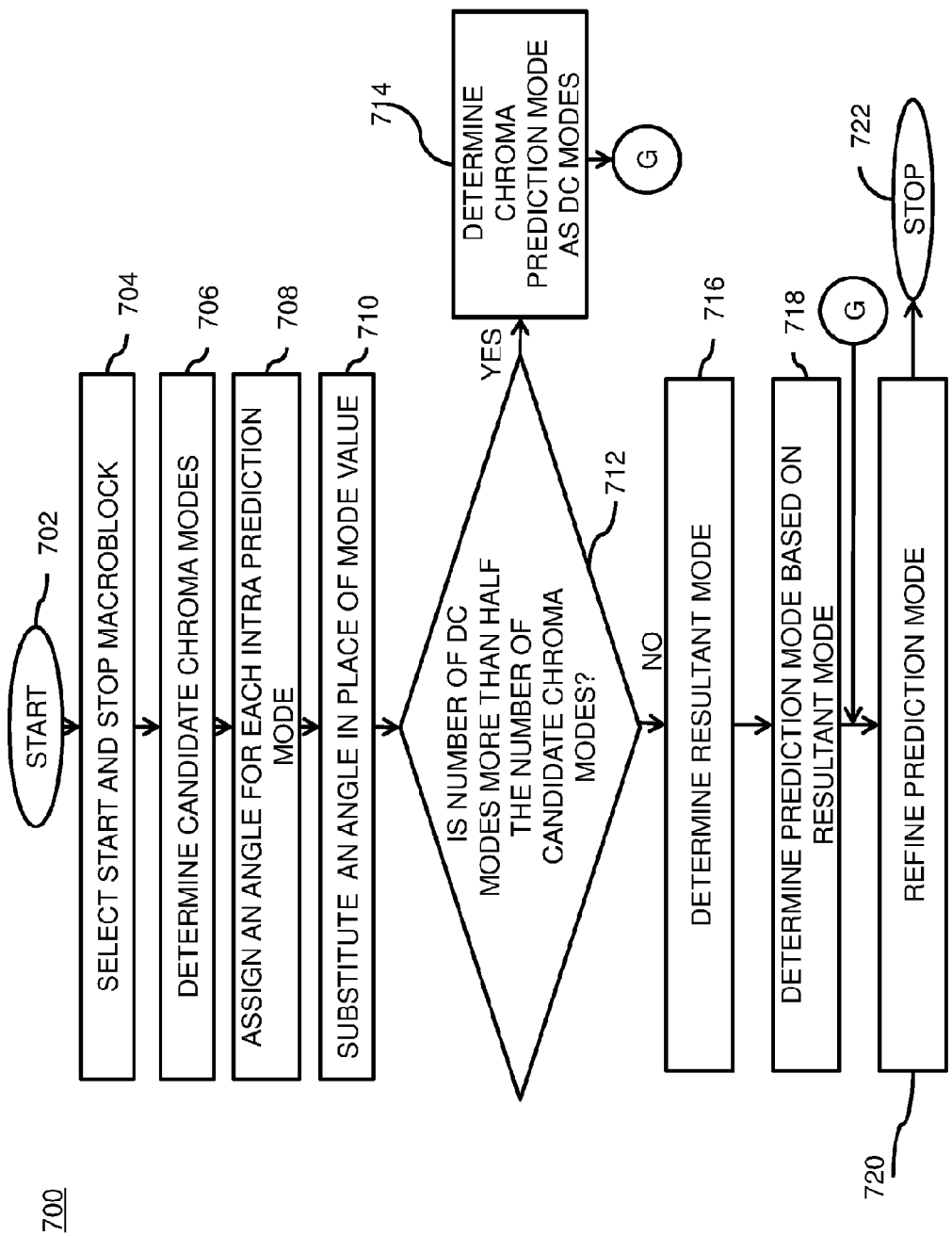

Having thus described the disclosure in general terms, reference will now be made to the accompanying drawings, which are not necessarily drawn to scale, and wherein:

FIG. 1 illustrates a system for transcoding a digital video, in accordance with various embodiments of the present disclosure;

FIG. 2 illustrates a flowchart for transcoding a digital video, in accordance with various embodiments of the present disclosure;

FIGS. 3A-3C illustrate a flowchart for resizing a digital video using the decoder information, in accordance with various embodiments of the present disclosure;

FIG. 4 illustrates a conversion table to convert quantization parameter (qp) to quantizer step size (qstep) and vice-versa, in accordance with various embodiments of the present disclosure;

FIG. 5 illustrates a flowchart for performing intra_4×4 mode selection or intra 8×8 mode selection, in accordance with various embodiments of the present disclosure;

FIG. 6 illustrates tables for assigning angles for each of intra-prediction modes, in accordance with various embodiments of the present disclosure;

FIG. 7 illustrates a flow chart for determining a chroma mode for a given macroblock, in accordance with various embodiments of the present disclosure; and FIG. 8 illustrates a table providing variation of threshold value of the motion vector determined in skip mode (thr_skip) with luma quantization parameter of the macroblock in an encoded frame (QPYe), in accordance with various embodiments of the present disclosure.

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a system 100 for transcoding a digital video, in accordance with various embodiments of the present disclosure. The system 100 includes a transcoding device 101. The transcoding device 101 transcode the digital video and provides the transcoded digital video to electronic devices 110. For example, a video file of a movie trailer may be transcoded by the transcoding device 101 (say a portable computer) so that the video file may be rendered on other electronic devices (say a mobile phone). The transocoded file may be transmitted to the mobile device via a wired or wireless network.

The transcoding device 101 includes a hierarchical motion sampling and re-estimation engine (hereinafter HMSR) 102, a decoder 104, a resizing engine 106 and an encoder 108. The encoder 108 includes a pre-encoding module (not shown in the FIG. 1) for pre-encoding the digital video. The pre-encoding module partitions each frame of the digital video into multiple macroblocks and encodes the macroblocks. The decoder 104 receives the pre-encoded digital video and extracts the decoder information. The decoder information includes syntax elements extracted during decoding. The syntax elements include but may not be limited to macroblock type, sub-macroblock type, quantization parameter (QP), intra luma modes, intra chroma modes, and motion vectors, skip information of each of the decoded macroblocks and the like. The decoder 104 provides the decoder information to the HMSR 102.

The HMSR 102 hierarchically evaluates the syntax elements extracted from the decoder 104. The resizing engine 106 in conjunction with HMSR 102 resizes each of the macroblock of the macroblocks based on evaluated hierarchical syntax elements. Accordingly, the encoder 108 encodes each of re-sized macroblock based on the evaluated hierarchical syntax elements.

FIG. 2 illustrates a flowchart 200 for transcoding a digital video, in accordance with various embodiments of the present disclosure. It may be noted that to explain the flowchart 200, references will be made to the various elements of FIG. 1.

The flowchart 200 initiates at step 202. At step 204, as mentioned above, a plurality of pre-determined decoder information pertaining to each macroblock of the macroblocks of each of a decoded frame of the decoded frames of the digital video is extracted. Following step 204, at step 206, the syntax elements pertaining to each of the macroblocks of the decoded frames are evaluated hierarchically. In an embodiment of the present disclosure, evaluating of the syntax elements pertaining to each macroblock of decoded frames includes determining prediction mode of each of a sub-macroblock of each the macroblock of the frames based on a second pre-defined criteria. The second pre-defined criteria are explained in conjunction with the various steps provided in FIGS. 3A-3C.

Following step 206, at step 208, each of the macroblocks is resized based on the evaluated hierarchical syntax elements. In an embodiment of the present disclosure, for determining each macroblock, relevant syntax elements from a bigger block of macroblocks from a decoded frame in the decoded video are extracted. The resizing engine 106 resizes the bigger block of the decoded frame to one macroblock using information from the HMSR 102. The HMSR 102 hierarchically evaluates the syntax elements extracted from the decoder 104. In an embodiment of the present disclosure, resizing each of macroblock based on the evaluated hierarchical syntax elements further includes determining mode decision for each of a sub-macroblock of each of the frames based on said first pre-defined criteria. The first pre-defined criteria are explained in conjunction with the various steps provided in FIG. 3.

In an embodiment of the present disclosure, the HMSR 102 learns and refines the syntax elements for aiding in motion estimation, thereby help in resizing.

It may be noted that the term "motion estimation" refers to a process of determining motion vectors that point to the best matching block in a reference frame. The motion vector therefore points to the position of the best matching block on the reference frame. As used herein, the term "best matching block" refers to a block in the reference frame that is similar to the macroblock currently being encoded. Also as used herein, the term "reference frame" refers to a previously encoded frame on which the best matching block is located. The refined syntax elements help in the motion estimation by serving as initial seed positions. A seed position for mode decision of a macroblock in the encoder 108 is determined from the decoder information. As used herein, the term "seed position" refers to a position of a pixel in the decoded frame that is a probable motion vector for a macroblock or a sub-macroblock for the encoder 104. The same refined syntax elements may be used as elements for compensation and coding directly, thus completely eliminating the motion estimation process, resulting to the reduction computational complexity, thereby providing faster results. Following step 208, at step 210, each of the resized macroblocks is encoded based on the evaluated hierarchical syntax elements. The flowchart 200 terminates at step 212.

FIGS. 3A-3C illustrate a flowchart 300 for resizing a digital video using the decoder information, in accordance with various embodiments of the present disclosure. It may be noted that to explain the flowchart 300, references will be made to the various elements of FIG. 1 and various process steps of flowchart 200.

The flowchart initiates at step 302. Following step 302, at step 304, the encoder 108 initiates re-estimation of the syntax elements for the macroblock in the encoded frame by first selecting the macroblocks from the decoded frame that are to be considered for resizing. For example, for a video of size of width-1920 and height-1080 to be resized to width-720 and height-576, the encoder 108 considers 2.5 macroblocks in a row and 2 macroblocks in a column from the decoded frame, for predicting one macroblock in the encoded frame.

Following step 304, at step 306, the HMSR 102 selects a start macroblock and an end macroblock. In an example, selection of start macroblock "row_start" and "col_start" and the end macroblock "row_end" and "col_end" in each row and column are as follows:

```
row = 0 to rMB − 1
{
row_start = ⌊ row x ht_ratio ⌋
row_end = ⌊ (row+1) x ht_ratio) ⌋ − 1
for col = 0 to cMB − 1
{
col_start = ⌊ col x wd_ratio ⌋
col_end = ⌊ (col+1) x wd_ratio ⌋ − 1
}}
``` where, rMB and cMB refer to number of macroblocks in a row and number of macroblocks in a column, respectively in the encoded frame;

*ht*_ratio=*dec_sMB_ht/enc_sMB_ht* and *wd*_ratio *dec-_sMB_wd/enc_sMB_wd*, where ht_ratio refers to height ratio between the decoded video and the encoded video, dec_sMB_ht refers to height of a sub-macroblock in the decoded frame, enc_sMB_ht refers to height of a sub-macroblock in the encoded frame, wd_ratio refers to width ratio between the decoded video and the encoded video, dec_sMB_wd refers to width of a sub-macroblock in the decoded frame, and enc_sMB_wd refers to width of a sub-macroblock in the encoded frame.

Following step 306, at step 308, the HMSR 102 selects candidate macroblock types (candidate_mb_type) from a candidate macroblock type matrix (mb_type_mat). In an example, the selection of candidate macroblock types (candidate_mb_type) from the candidate macroblock type matrix (mb_type_mat) is as follows: candidate_mb_type=mb_type_mat (row_start: row_end, col_start: col_end). For example, for candidate_mb_type=mb_type_mat (3:5, 2:3), the HMSR 102 considers the macroblocks 3, 4, and 5 in a given row and macroblocks 2 and 3 in a given column for the candidate macroblock type. Following step 808, at step 310, the HMSR 102 selects candidate quantization parameters (candidate_QP) from a quantization parameter matrix (QP_mat) as follows: candidate_QP=QP_mat(row_start: row_end, col_start:col_end) and converts the quantization parameter (QP) to quantizer step size (Qstep) based on a conversion table illustrated in FIG. 4. The QP is converted to Qstep, as QP is a non-linear quantity and cannot be averaged.

Following step 310, at step 312, the HMSR 102 averages the Qstep. In an example, the process step 312 is as follows: new_QP_mat (row,col)=average (candidate_QP) and converts the Qstep back to QP based on the conversion table illustrated in FIG. 8.

Following step 312, at step 314, the HMSR 102 checks whether there is a recurring macroblock type in the candidate macroblock type matrix. Following step 314, at step 316, if there is a recurring macroblock type in the candidate macroblock type matrix, the HMSR 102 determines the macroblock type for the encoded video based on the candidate macroblock types. In an example, determines the macroblock type is as follows: new_mb_type_mat (row, col) =highest (candidate_mb_type). In other words, the HMSR 102 determines the most recurring macroblock type in the candidate macroblock type matrix as the macroblock type.

Following step 316, at step 318, if all the candidate macroblock types are different, the HMSR 102 considers P_8×8 as the macroblock type. Following step 318, at step 320, if the macroblock type is determined as P_8×8, the HMSR 102 determines a sub-macroblock type matrix.

In an embodiment of the present disclosure, the HMSR 102 determines a first candidate sub-macroblock type matrix (cand_smb_type1) in a first 8×8 sub-macroblock. In an example, the determination is as follows:

$$row8\_start = \lfloor 2 \times row \times ht\_ratio \rfloor$$

$$row8\_end = \lfloor (2 \times row+1) \times ht\_ratio/2 \rfloor - 1$$

$$col8\_start = \lfloor 2 \times col \times wd\_ratio \rfloor$$

$$col8\_end = \lfloor (2 \times col+1) \times wd\_ratio/2 \rfloor - 1$$

$$cand\_smb\_type1 = sub\_8 \times 8\_mb\_type(row8\_start: row8\_end, col8\_start: col8\_end)$$

In another embodiment of the present disclosure, the HMSR 102 determines a second candidate sub-macroblock type matrix (cand_smb_type2) in a second 8×8 sub-macroblock. In an example, the stated determination is as follows:

$$col8\_start = \lfloor (2 \times col+1) \times wd\_ratio/2 \rfloor$$

$$col8\_end = \lfloor (2 \times col+1) \times wd\_ratio \rfloor - 1$$

$$cand\_smb\_type2 = sub\_8 \times 8\_mb\_type(row8\_start: row8\_end, col8\_start: col8\_end)$$

In yet another embodiment of the present disclosure, the HMSR 102 determines a third candidate sub-macroblock type (cand_smb_type3) matrix in a third 8×8 sub-macroblock. In an example, the stated determination is as follows:

$$row8\_start = \lfloor (2 \times row+1) \times ht\_ratio/2 \rfloor$$

$$row8\_end = \lfloor (2 \times row+1) \times ht\_ratio \rfloor - 1$$

$$col8\_start = \lfloor 2 \times col \times wd\_ratio \rfloor$$

$$col8\_end = \lfloor (2 \times col+1) \times wd\_ratio/2 \rfloor - 1$$

$$cand\_smb\_type3 = sub\_8 \times 8\_mb\_type(row8\_start: row8\_end, col8\_start: col8\_end)$$

In yet another embodiment of the present disclosure, the HMSR 102 determines a fourth candidate sub-macroblock type matrix (cand_smb_type4) in a fourth 8×8 sub-macroblock. In an example, the stated determination is as follows:

$$col8\_start = \lfloor (2 \times col+1) \times wd\_ratio/2 \rfloor$$

$$col8\_end = \lfloor (2 \times col+1) \times wd\_ratio \rfloor - 1$$

$$cand\_smb\_type4 = sub\_8 \times 8\_mb\_type(row8\_start: row8\_end, col8\_start: col8\_end)$$

In yet another embodiment of the present disclosure, the HMSR 102 creates a sub-macroblock type matrix from the four candidate sub-macroblock type matrices. In an example, the stated creation is as follows:

$$new\_sub\_mb\_type\_mat(row,col,1) = highest (cand\_smb\_type1)$$

$$new\_sub\_mb\_type\_mat(row,col,2) = highest (cand\_smb\_type2)$$

$$new\_sub\_mb\_type\_mat(row,col,3) = highest (cand\_smb\_type3)$$

$$new\_sub\_mb\_type\_mat(row,col,4) = highest (cand\_smb\_type4)$$

In yet another embodiment of the present disclosure, the HMSR 102 selects a highest sub-macroblock type from each of the four candidate sub-macroblock type matrices.

Following step 320, at step 322, the HMSR 102 checks whether there is a recurring sub-macroblock type in the sub-macroblock type matrix. At step 324, if there is a recurring sub-macroblock type in the candidate macroblock type matrix, the HMSR 102 determines the most recurring sub-macroblock type in the sub-macroblock type matrix as the sub-macroblock type.

Following step 324, at step 326, if all the candidate macroblock types are different, the HMSR 102 determines P_4×4 as the sub-macroblock type. Following step 326, at step 328, the HMSR 102 determines candidate luma modes (candidate_modes) for each of the sub-macroblocks. In an example, the stated determination is as follows:

$$candidate\_modes = mode\_d\_Y(row\_start:row\_end, col\_start:col\_end)$$

where, mode_d_Y refers to the luma mode of each sub-macroblock in the decoded video.

In an embodiment of the present disclosure, the HMSR 102 first determines a start sub-macroblock and a stop sub-macroblock in each row and column, for each sub-macroblock. In an example, the stated determination is as follows:

for row=0 to (4×rMB−1)

$$row\_start = \lfloor row \times ht\_ratio \rfloor$$

$$row\_end = \lfloor (row+1) \times ht\_ratio \rfloor - 1$$

for col=0 to (4×cMB−1)

$$col\_start = \lfloor col \times wd\_ratio \rfloor$$

$$col\_end = \lfloor (col+1) \times wd\_ratio) \rfloor - 1$$

In another embodiment of the present disclosure, the HMSR 102 extracts mode values that correspond to a mode decision of each macroblock from the decoder information. In an embodiment, the following are the mode values and the corresponding prediction modes:

0—Intra4×4 Vertical Prediction
1—Intra4×4 Horizontal Prediction
2—Intra4×4 DC Prediction
3—Intra4×4 diagonal down left (DDL) Prediction
4—Intra4×4 diagonal down right (DDR) Prediction
5—Intra4×4 vertical right (VR) Prediction
6—Intra4×4 horizontal down (HD) Prediction
7—Intra4×4 vertical left (VL) Prediction
8—Intra4×4 horizontal up (HU) Prediction
9—Intra8×8 Vertical Prediction
10—Intra8×8 Horizontal Prediction
11—Intra8×8 DC Prediction
12—Intra8×8 diagonal down left (DDL) Prediction 13—Intra8×8 diagonal down right (DDR) Prediction
14—Intra8×8 vertical right (VR) Prediction
15—Intra8×8 horizontal down (HD) Prediction
16—Intra8×8 vertical left (VL) Prediction
17—Intra8×8 horizontal up (HU) Prediction
18—Intra16×16 Vertical Prediction
19—Intra16×16 Horizontal Prediction
20—Intra16×16 DC Prediction
21—Intra16×16 Plane Prediction
22—Inter16×16 Prediction
23—Inter SKIP Prediction Following step 328, at step 330, the HMSR 102 checks whether more than half the numbers of the candidate modes are inter modes. Following step 330, at step 332, if more than half the numbers of the candidate luma modes are inter modes, the HMSR 102 declares the luma mode for the given sub-macroblock as inter mode. Following step 332, at step 334, if more than half the numbers of candidate modes are not inter modes, then the HMSR 102 calculates strength of the candidate luma modes. In other words, the HMSR 102 averages the mode numbers given for each of the sub-macroblocks in the macroblock in order to find the strength.

Following step 334, at step 336, the HMSR 102 checks whether the calculated strength is greater than or equal to 22. Following step 336, at step 338, if the strength is greater than or equal to 22, that is, mode_e_Y(row,col)=23, the HMSR 102 declares the macroblock as a skip macroblock and evaluates P_SKIP. At step 340, if the strength is not greater than or equal to 22, then the HMSR 102 checks whether the strength if greater than or equal to 21.

Following step 340, at step 342, if the strength is greater than or equal to 21, the HMSR 102 declares the mode as inter mode, that is, mode_e_Y(row,col)=22. At step 344, if the strength is not greater than or equal to 21, then the HMSR 102 checks whether the strength is greater than or equal to 18. At step 346, if the strength is greater than or equal to 18, the HMSR 102 declares the luma mode as intra 16×16 DC prediction, that is, mode_e_Y(row,col)=20. At step 348, if the strength is not greater than or equal to 18, the HMSR 102 checks whether the strength is greater than or equal to 9. At step 350, if the strength is greater than or equal to 9, the HMSR 102 declares the luma mode as intra_8×8 mode and then performs an intra 8×8 mode selection as disclosed in the detailed description of FIG. 5.

Following step 350, at step 352, if the strength is lesser than 9, the HMSR 102 declares the luma mode as intra_4×4 and then performs an intra_4×4 mode selection, as disclosed in the detailed description of FIG. 5. It may be noted that the two or more process steps 304-312 explained above which enable determination of mode decision for each of the macroblock/sub-macroblock of each of the frames can be referred to as first pre-defined criterion in context of the present application. Similarly, it may be noted that the two or more process steps 304-312 explained above which enable prediction mode of each of a sub-macroblock of each the macroblock of the frames can be referred to as first pre-defined criterion in context of the present application. The flowchart terminates at step 354.

As mentioned above, FIG. 4 is a conversion table 400 to convert the quantization parameter (QP) to quantizer step size (Qstep). In an embodiment of the present disclosure, QP is converted to Qstep, as QP is a non-linear quantity and cannot be averaged. The conversion table 400 is used to convert the quantizer step size (Qstep) back to quantization parameter (QP).

FIG. 5 illustrates a flowchart 500 for performing intra_4×4 mode selection or intra 8×8 mode selection, in accordance with the various embodiments of the present disclosure. The flowchart initiates at step 502. At step 504, the HMSR 102 assigns an angle for each of the intra prediction modes (shown in FIG. 6). Following step 504, at step 506, the HMSR 102 substitutes the angle in place of the mode value for each of the sub-macroblocks in the macroblock. The angles substituted in place of the modes indicate the general direction in which the video is moving.

Following step 506, at step 508, the HMSR 102 counts the number of DC modes and checks whether the number of DC modes is more than half the number of the candidate luma modes. At step 510, if the number of DC modes is more than half of number candidate modes, then the HMSR 102 determines the intra prediction mode as DC mode. Following step 510, at step 512, if the number of DC modes is not more than half the candidate modes, the HMSR 102 determines average of the angles of the remaining candidate luma modes, herein referred to as "resultant mode" (r). At step 514, the HMSR 102 determines the prediction mode based on the resultant mode. In an example, the stated determinations is as follows:

mode_e_Y(row,col)=2, if r<(22.5)/2; in this case the intra prediction mode is intra 4×4 DC mode.

mode_e_Y(row,col)=8, if (0+22.5)/2≤r<(22.5+45)/2; in this case the intra prediction mode is intra 4×4 horizontal up (HU) mode.

mode_e_Y(row,col)=1, if (22.5+45)/2≤r<(45+67.5)/2; in this case the intra prediction mode is intra 4×4 horizontal mode.

mode_e_Y(row,col)=6, if (45+67.5)/2≤r<(67.5+90)/2; in this case the intra prediction mode is intra 4×4 horizontal down (HD) mode.

mode_e_Y(row,col)=4, if (67.5+90)/2≤r<(90+112.5)/2; in this case the intra prediction mode is intra 4×4 diagonal down right (DDR) mode.

mode_e_Y(row,col)=5, if (90+112.5)/2≤r<(112.5+135)/2; in this case the intra prediction mode is intra 4×4 vertical right (VR) mode.

mode_e_Y(row,col)=0, if (112.5+135)/2≤r<(135+157.5)/2; in this case the intra prediction mode is intra 4×4 vertical mode.

mode_e_Y(row,col)=7, if (135+157.5)/2≤r<(157.5+180)/2; in this case the intra prediction mode is intra 4×4 vertical left (VL) mode.

mode_e_Y(row,col)=3, if (157.5+180)/2<r; in this case the intra prediction mode is intra 4×4 diagonal down left (DDL) mode.

Following step 514, at step 516, the HMSR 102 refines the prediction mode for each macroblock in the encoded frame, thereby ensuring compliance to the H.264 video compression. candidate_modes=mode_e_Y(macroblock), where mode_e_Y (macroblock) refers to the luma mode of a macroblock in the encoded frame. If more than half of the candidate modes are inter modes, the HMSR 102 determines the luma prediction mode as inter 16×16 mode; that is, mode_e_Y(macroblock)=22. If more than half the candidate modes are not inter modes, the HMSR 102 determines the highest mode from among the candidate modes. The highest mode may be intra_16×16 or intra_8×8 or intra_4×4.

In an embodiment of the present disclosure, the highest mode may be intra_16×16, mode_e_Y(macroblock)=18 to 21. The other modes are copied from intra_16×16 mode. For intra 16×16 mode, the HMSR 102 determines the mode as DC mode for the first row and first column of the macroblock. In the first column, if the mode is horizontal or plane, the HMSR 102 modifies the mode to DC mode. In the first row, if the mode is vertical or plane, the HMSR 102 modifies the mode to DC mode. Otherwise, the luma mode (mode_e_Y) is retained as intra_16×16 mode.

In another embodiment of the present disclosure, the highest mode may be intra_8×8, mode_e_Y(macroblock)=9 to 17. In this case, if any of the modes are intra_16×16, the HMSR 102 modifies them to intra_8×8 modes. The HMSR 102 converts the plane modes to DDL mode. If any of the modes are intra_4×4, the HMSR 102 modifies them to intra_8×8. The other modes are DC modes.

In yet another embodiment of the present disclosure, the highest mode may be intra_4×4, mode_e_Y(macroblock)=0 to 8. In this case, if any of the modes are intra_16×16 the HMSR 102 modifies them to intra_4×4 modes. The HMSR 102 modifies the plane modes to DDL mode. If any of the modes are intra_8×8, the HMSR 102 modifies them to intra_4×4. The other modes are DC modes.

In yet another embodiment of the present disclosure, if the mode is intra_4×4 or intra_8×8, the HMSR 102 modifies the mode in the first row and first column of the frame to DC mode. If the mode in the first row is vertical, DDL, VR, HD, VL, or HU, then the HMSR 102 modifies them to DC mode. If the mode in first column is horizontal, DDR, VR, HD, or HU, the HMSR 102 changes the mode to DC mode. The flowchart 500 terminates at step 518.

As mentioned above, FIG. 6 illustrates tables for assigning the angles for each of the intra-prediction modes. The HMSR 102 substitutes the angle in place of the mode value for each of the sub-macroblocks in the macroblock. The angles substituted in place of the modes indicate the general direction in which the video is moving.

FIG. 7 illustrates a flowchart 700 for determining a chroma mode for a given macroblock. The flowchart 700 initiates at step 702. Following step 702, at step 704, the HMSR 102 selects a start sub-macroblock and a stop sub-macroblock in each row and column, for each sub-macroblock as follows:

for row=0 to (2×*rMB*−1)

row_start=⌊row×*ht*_ratio⌋ row_end=⌊(row+1)×*ht*_ratio⌋−1 for *col*=0 to (2×*cMB*−1)

*col*_start=⌊*col*×*wd*_ratio⌋

*col*_end=⌊(*col*+1)×*wd*_ratio⌋−1

Following step 704, at step 706, the HMSR 102 then determines candidate chroma modes for each of the sub-macroblocks as follows:

candidate_modes=mode_*d*_*C*(row_start:row_end, *col*_start:*col*_end)

Following step 706, at step 708, the HMSR 102 assigns an angle for each of the intra prediction modes in the sub-macroblock, as illustrated in FIG. 6. Following step 708, at step 710, the HMSR 102 then substitutes the angle in place of the mode value for each of the sub-macroblocks. The angles substituted in place of the modes indicate the general direction in which the video is moving. At step 712, the HMSR 102 counts the number of DC modes and Plane modes and checks whether the number of DC modes is more than half the number of the candidate chroma modes.

Following step 712, at step 714, if the number of DC modes is more than half of number candidate modes, then the HMSR 102 determines the prediction as DC mode. At step 716 if the number of DC modes is not more than half the candidate modes, the HMSR 102 determines average of the angles of the remaining candidate luma modes, referred to as "resultant mode" (r). At step 718, the HMSR 102 determines the prediction mode based on the resultant mode. In an example, the stated determination is as follows:

mode_e_C(row,*col*)=1, if *r*<22.5; in this case the intra prediction mode is intra 4×4 horizontal mode.

mode_e_C(row,*col*)=3, if 22.5≤*r*<(90−22.5); in this case the intra prediction mode is intra 4×4 DDL mode.

mode_e_C(row,*col*)=2, if (90−22.5)≤*r*<(90+22.5); in this case the intra prediction mode is intra 4×4 DC mode.

mode_e_C(row,*col*)=0, if (90+22.5)≤*r*; in this case the intra prediction mode is intra 4×4 vertical mode.

Following step 718, at step 720, the HMSR 102 refines the prediction mode for each sub-macroblock in the encoded frame. In the first column of sub-macroblocks in the frame, that is, col=1, if the mode is horizontal, the HMSR 102 modifies the mode to DC mode and if the mode is plane, the HMSR 102 modifies the mode to vertical mode. Further, if the mode is vertical in the first row of the sub-macroblocks in the frame, that is, row=1, the HMSR 102 modifies the mode to DC mode. If the mode is plane, the HMSR 102 modifies the mode to horizontal mode.

In an embodiment of the present disclosure, the HMSR 102 determines motion vectors for each sub-macroblock in a macroblock of a frame. The HMSR 102 selects a start sub-macroblock and a stop sub-macroblock in each row and column, for each sub-macroblock. In an example, the stated selection is as follows:

```
for row = 0 to (4 x rMB - 1)
{
row_start = ⌊ row x ht_ratio⌋
row_end = ⌊ (row+1) x ht_ratio⌋ - 1
}
for col = 0 to (4 x cMB - 1)
{
col_start = ⌊ col x wd_ratio⌋
col_end = ⌊ (col+1) x wd_ratio⌋ - 1
}
```

In another embodiment of the present disclosure, the HMSR 102 selects candidate motion vectors (mvx and mvy) for each of the sub-macroblocks as follows:

cand_*x*=mvx_*d*_*Y*(row_start:row_end,*col*_start:*col*_end)

cand_*y*=mvy_*d*_*Y*(row_start:row_end,*col*_start:*col*_end)

where, mvx_d_Y refers to an x-motion vector of a 4×4 sub-macroblock in the decoded frame and mvy_d_Y refers to a y-motion vector of a 4×4 sub-macroblock in the decoded frame.

In yet another embodiment of the present disclosure, the HMSR 102 determines an x-motion vector and a y-motion vector of a 4×4 sub-macroblock in the encoded frame by averaging the candidate motion vectors (mvx and mvy) and rounding as follows:

$$mvx\_e\_Y(row, col) = \text{round}(\text{average}(cand\_x)/wd\_\text{ratio})$$

$$mvy\_e\_Y(row, col) = \text{round}(\text{average}(cand\_y)/ht\_\text{ratio})$$

In yet another embodiment of the present disclosure, the HMSR 102 then refines the macroblock type based on the determined motion vectors. The HMSR 102 refines the mode of a macroblock, if the macroblock belongs to a predicted (P) frame) or if the macroblock is a skip macroblock (P_SKIP). First, the HMSR 102 checks whether a macroblock is P_Frame or P_SKIP and creates matrices maty and matx. In an example, the stated checking is as follows:

```
If mode_e_Y(Macroblock) is P_Frame or P_SKIP
{
    maty = mvy_e_Y(Macroblock)
    matx = mvx_e_Y(Macroblock)
}
``` where, maty refers to a matrix comprising y components of the motion vectors of the given macroblock and matx refers to a matrix comprising x components of the motion vectors of the given macroblock.

In yet another embodiment of the present disclosure, if the macroblock type is P_SKIP or QPYe≥28, the HMSR 102 determines a motion vector predicted under the P_SKIP mode referred to as "mvp_P16×16" as per the H.264 standard, where QPYe refers to luma quantization parameter of the macroblock in the encoded frame. The HMSR 102 then modifies the macroblock type matrix mb_type_mat(Macroblock) and the luma mode of the macroblock in the encoded frame as follows:

$$mb\_type\_mat(\text{Macroblock})=0, \text{ that is, } P\_16\times16$$

$$mode\_e\_Y(\text{Macroblock})=P\_SKIP$$

In yet another embodiment of the present disclosure, if the macroblock type is P_16×16, the HMSR 102 determines a single motion vector (fmvy and fmvx) for a macroblock, by averaging all the motion vectors in both x and y directions. Here, fmvy refers to the y-motion vector for the macroblock and fmvx refers to the x-motion vector for the macroblock. The HMSR 102 then replaces the motion vectors in maty and matx by fmvy and fmvx. The codec then determines the difference between the calculated motion vectors under P_16×16 mode and P_SKIP mode. If QPYe≥28 and abs (fmv−mvp_skip)≤thr_skip, the HMSR 102 modifies the luma mode of the macroblock in the encoded frame to P_SKIP mode. That is, mode_e_Y(Macroblock)=P_SKIP. As used herein, the term "thr_skip" refers to a threshold value of the motion vector determined in skip mode. The thr_skip values may vary with the luma quantization parameter of the macroblock in the encoded frame (QPYe), as illustrated in FIG. 8. If the difference between the motion vectors under the P_16×16 mode and the P_SKIP mode is large, the HMSR 102 retains the luma mode of the macroblock in the encoded frame as P_16×16. That is, mode_e_Y (Macroblock)=P_16×16 and mb_type_mat(Macroblock)=0 (that is, P_16×16).

In yet another embodiment of the present disclosure, if the macroblock type is P_16×8, that is, mb_type_mat (Macroblock)=1, the HMSR 102 determines motion vectors for a top P_16×8 sub-macroblock by averaging the top 4×2 motion vectors of maty and matx and replacing them in maty and matx. The HMSR 102 then determines the motion vectors for the bottom P_16×8 sub-macroblock by averaging the bottom 4×2 motion vectors of maty and matx and replacing them in maty and matx.

In yet another embodiment of the present disclosure, if the macroblock type is P_8×16, that is, mb_type_mat (Macroblock)=2, the HMSR 102 determines the motion vectors for the left P_8×16 sub-macroblock by averaging the left 2×4 motion vectors of maty and matx and replacing them in maty and matx. The HMSR 102 then determines the motion vectors for the right P_8×16 sub-macroblock by averaging the right 2×4 motion vectors of maty and matx and replacing them in maty and matx.

In yet another embodiment of the present disclosure, if the macroblock type is P_8×8, that is, mb_type_mat(Macroblock)=4, for each sub-macroblock the HMSR 102 stores the motion vectors of each 8×8 sub-macroblock in matrices ty and tx. Here, ty=maty(sub macroblock) and tx=matx(sub macroblock). If the sub-macroblock type is P_8×8, the HMSR 102 modifies the matrices ty and tx as follows: ty=average(ty) and tx=average(tx). Else if the sub-macroblock type is P_8×4, the HMSR 102 determines the motion vectors for the top P_8×4 sub-macroblock by averaging the top 2×1 motion vectors of ty and tx and replacing them in ty and tx. Further, the HMSR 102 determines the motion vectors for the bottom P_8×4 sub-macroblock by averaging the bottom 2×1 motion vectors of ty and tx and replacing those in ty and tx. Else if the sub macroblock type is P_4×8, the HMSR 102 determines the motion vectors for the left P_4×8 sub-macroblock by averaging the left 1×2 motion vectors of ty and tx and replacing them in ty and tx. The HMSR 102 then determines the motion vectors for the right P_4×8 sub-macroblock by averaging the right 1×2 motion vectors of ty and tx and replacing them in ty and tx. Else if the sub-macroblock type is P_4×4, the HMSR 102 retains all the motion vectors.

In yet another embodiment of the present disclosure, if the quantization parameter of the luma mode in the encoded frame is high, that is, QPYe>=28, and if the sub-macroblock type is not P_8×8, and if the absolute difference between the top motion vectors<=threshold motion vector (thr_mv) and the absolute difference between the bottom motion vectors<=thr_mv, then the HMSR 102 modifies the sub-macroblock type to P_8×4. The top and bottom motion vectors are calculated by averaging. Else if QPYe>=28, and if the sub-macroblock type is not P_8×8, and if the absolute difference between the top motion vector and the bottom motion vector<=thr_mv, the HMSR 102 modifies the sub-macroblock type to P_8×8. The motion vectors are calculated by averaging. Else if absolute difference between left motion vectors<=thr_mv and absolute difference between right motion vectors<=thr_mv, then the HMSR 102 modifies the sub-macroblock type to P_4×8. The left and right motion vectors are calculated by averaging. If the absolute difference between the left and right motion vectors<=thr_mv, the HMSR 102 modifies the sub macroblock type to P_8×8. The motion vectors are calculated by averaging. The HMSR 102 the updates the motion vector matrices as follow:

$$maty(\text{sub-macroblock})=ty$$

$$matx(\text{sub-macroblock})=tx$$

In yet another embodiment of the present disclosure, if QPYe>=28 and the mode is inter-mode, and if the macroblock type is P_8×8 and all sub-macroblock types are P_8×8, and if absolute difference between the motion vectors of a top-left 8×8 sub-macroblock and top-right 8×8 sub-macroblock<=thr_mv and absolute difference between the motion vectors of bottom-left 8×8 sub-macroblock and bottom-right 8×8 sub-macroblock<=thr_mv, then the HMSR 102 modifies the macroblock type P_16×8. The top and bottom P_16×8 motion vectors are calculated by averaging.

In yet another embodiment of the present disclosure, if QPYe>=28 and the mode is inter-mode, and if the macroblock type is P_8×8 and all sub-macroblock types are P_8×8, and if absolute difference of top and bottom motion vectors<=thr_P16×16, then the HMSR 102 modifies the macroblock type is P_16×16. The motion vector is calculated by averaging. Else, if absolute difference between the motion vectors of a top-left 8×8 sub-macroblock and a bottom-left 8×8 sub-macroblock<=thr_mv and absolute difference between the motion vectors of a top-right 8×8 sub-macroblock and a bottom-right 8×8 sub-macroblock<=thr_mv, then the HMSR 102 modifies the macroblock type to P_8×16. The left and right P_8×16 motion vectors are calculated by averaging. If absolute difference of the left and right motion vectors<=thr_P16×16, the HMSR 102 modifies the macroblock type to P_16×16. The motion vector is calculated by averaging.

In yet another embodiment of the present disclosure, if QPYe>=28, the mode is inter-mode, the macroblock type is P_8×16, and if absolute difference of the left and right motion vectors<=thr_P16×16, the HMSR 102 modifies the macroblock type to P_16×16. The motion vector is calculated by averaging.

In yet another embodiment of the present disclosure, if QPYe>=28, the mode is inter-mode, the macroblock type is P_16×8, and if absolute difference of the top and bottom motion vectors<=thr_P16×16, the HMSR 102 modifies the macroblock type P_16×16. The motion vector is calculated by averaging. The HMSR 102 updates the motion vector matrices. In an example, the stated updating is as follows:

$$mvy\_e\_Y(macroblock)=maty$$

$$mvx\_e\_Y(macroblock)=matx$$

In yet another embodiment of the present disclosure, if QPYe>=28, the macroblock type is P_16×16, and if absolute difference of P_16×16 motion vector and skip motion vectors<=thr_skip, the HMSR 101 declares the mode as skip. That is, mode_e_Y(macroblock)=P_SKIP. If QPYe>=28, the macroblock type is P_16×16, and if absolute difference of P_16×16 motion vector and skip motion vectors>thr_skip, the HMSR 102 declares the mode as P_16×16. That is, mode_e_Y(macroblock)=P_16×16. The flowchart 700 terminates at step 722.

As mentioned above, FIG. 8 illustrates a table 800 providing the variation of the thr_skip values with the luma quantization parameter of the macroblock in the encoded frame (QPYe).

In yet another aspect of the present disclosure, a computer system for transcoding a digital video is provided. The computer system includes one or more processors and a non-transitory memory. The non-transitory memory includes instructions that, when executed by the one or more processors, causes a transcoding module (or transcoding device 101) of the one or more processors to perform a set of steps. The set of steps include extracting, by the decoder 104, the plurality of pre-determined decoder information pertaining to the each macroblock of the plurality of macroblocks of each of the decoded frame of the plurality of decoded frames of the digital video, evaluating, by the hierarchical motion sampling and re-estimation engine 102, hierarchically the syntax elements pertaining to each the macroblock of the plurality of macroblocks of the plurality of decoded frames by determining prediction mode of each of the sub-macroblock of the each macroblock of the plurality of macroblocks of the plurality of frames based on the second pre-defined criteria, resizing, by the resizing engine 106, each of the macroblock of the plurality of macroblocks based on the evaluated hierarchical syntax elements, encoding, by the encoder 108, each of the re-sized macroblock based on the evaluated hierarchical syntax elements.

In an embodiment of the present disclosure, the resizing engine 106 resizes each of the macroblock of the plurality of macroblocks based on the evaluated hierarchical syntax elements by determining mode decision for each of the sub-macroblock of the each macroblock of the plurality of macroblocks of each of the plurality of frames based on the first pre-defined criteria.

The present disclosure provides methods and systems to enable transcoding of a digitally encoded video with reduced complexity. Further, the methods and systems enable utilization of the available information for encoding of the frame to reduce computational complexity. In the stated methods and systems, the encoder performs motion estimation and mode decision by taking inputs of decoder information of each frame from the HAW and the decoder, thereby simplifying the steps of the motion estimation and the mode decision.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for transcoding a decoded frame of a digital video to a re-sized frame, the method comprising:
    extracting a plurality of syntax elements of a plurality of macro-blocks of the decoded frame of the digital video;
    selecting candidate macro-blocks from the plurality of macro-blocks of the decoded frame based on a resizing ratio;
    evaluating hierarchically the plurality of syntax elements of each of the candidate macro-blocks;
    based on the result of the hierarchical evaluation, determining a macro-block type, wherein the macro-block type is the macro-block type occurring the most number of times, else the macro-block type is a 4*4 sub-macro-block type; and
    for the determined macro-block or sub-macro-block type,
    choosing inter mode as a luma mode for a re-sized macro-block, if more than half the number of luma modes are inter modes;
    else, calculating a strength of the luma modes by averaging mode values corresponding to mode decisions of each of the macro-block or sub-macro-block of the candidate macro-blocks wherein the mode values are obtained from a predefined table of mode values and mode decisions;
    comparing the calculated strength of the luma modes with pre-defined values for determining the luma mode as one of intra 16*16 mode, intra 8*8 mode or intra 4*4 mode; and
    encoding the target macro-block using the determined luma mode.

2. The method as claimed in claim 1, wherein the plurality of syntax elements of the plurality of macro-blocks of the decoded frame of the digital video comprises at least one of a macro-block type, sub-macro-block type, quantization parameter, intra luma modes, intra chroma modes, motion vectors, and skip mode information.

3. The method as claimed in claim 1, wherein evaluating hierarchically the plurality of syntax elements of each of the candidate macro-blocks comprises:
 identifying recurring macro-block type in the candidate macro-block type matrix; and
 selecting recurring macro-block type as a macro-block type of the re-sized macro-block, if the recurring macro-block type exists in the candidate macro-block type matrix;
 else, evaluating 8*8 sub-macro-blocks of each of the candidate macro-blocks.

4. The method as claimed in claim 3, wherein evaluating the 8*8 sub-macro-blocks of each of the candidate macro-blocks comprises:
 identifying first, second, third, and fourth 8*8 sub-macro-block type of each of the candidate macro-blocks for generating a candidate sub-macro-block type matrix; and
 selecting recurring sub-macro-block type as a sub-macro-block type of the re-sized macro-block, if the recurring sub-macro-block type exists in the candidate sub-macro-block type matrix;
 else, selecting 4*4 sub-macro-blocks of each of the candidate macro-blocks.

5. A system for resizing a decoded frame of a digital video to a re-sized frame, the system comprising:
 a decoder configured for extracting a plurality of syntax elements of a plurality of macro-blocks of the decoded frame of the digital video;
 a HMSR module in conjunction with a resizing engine configured for:
  selecting candidate macro-blocks from the plurality of macro-blocks of the decoded frame based on a resizing ratio;
  evaluating hierarchically the plurality of syntax elements of each of the candidate macro-blocks;
  based on the result of the hierarchical evaluation, determining a macro-block type, wherein the macro-block type is the macro-block type occurring the most number of times, else the macro-block type is a 4*4 sub-macro-block type; and
  for the determined macro-block or sub-macro-block type,
  choosing inter mode as the luma mode for a re-sized macro-block, if more than half the number of luma modes are inter modes;
  else, calculating a strength of the luma modes by averaging mode values corresponding to mode decisions of each of the macro-block or sub-macro-block of the candidate macro-blocks wherein the mode values are obtained from a predefined table of mode values and mode decisions;
  comparing the calculated strength of the luma modes with pre-defined values for determining the luma mode as one of intra 16*16 mode, intra 8*8 mode or intra 4*4 mode; and
 an encoder configured for encoding the target macro-block using the determined luma mode.

* * * * *